United States Patent
Sakatani

(10) Patent No.: US 9,906,689 B2
(45) Date of Patent: Feb. 27, 2018

(54) IMAGE FORMING APPARATUS AND COMPUTER READABLE RECORDING MEDIUM

(71) Applicant: Konica Minolta, Inc., Tokyo (JP)

(72) Inventor: Kazuomi Sakatani, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/440,024

(22) Filed: Feb. 23, 2017

(65) Prior Publication Data

US 2017/0251129 A1 Aug. 31, 2017

(30) Foreign Application Priority Data

Feb. 25, 2016 (JP) .................................. 2016-034022

(51) Int. Cl.
| | | |
|---|---|---|
| *H04N 1/60* | (2006.01) | |
| *H04N 1/40* | (2006.01) | |
| *G06K 15/00* | (2006.01) | |
| *H04N 1/00* | (2006.01) | |

(52) U.S. Cl.
CPC ....... *H04N 1/6044* (2013.01); *H04N 1/00013* (2013.01); *H04N 1/00023* (2013.01); *H04N 1/00045* (2013.01); *H04N 1/6008* (2013.01); *H04N 1/6091* (2013.01); *H04N 2201/0094* (2013.01)

(58) Field of Classification Search
CPC ............. H04N 1/6044; H04N 1/00013; H04N 1/00023; H04N 1/00045; H04N 1/6008; H04N 1/6091; H04N 2201/0094
See application file for complete search history.

(56) References Cited

U.S. PATENT DOCUMENTS

| | | | |
|---|---|---|---|
| 2010/0086201 A1* | 4/2010 | Muto | H04N 1/6033 382/162 |
| 2013/0094040 A1 | 4/2013 | Tomii | |
| 2014/0071504 A1* | 3/2014 | Kuno | H04N 1/00015 358/505 |
| 2015/0350493 A1 | 12/2015 | Sakatani | |
| 2015/0365564 A1 | 12/2015 | Imaseki et al. | |
| 2017/0099414 A1 | 4/2017 | Yamaguchi | |

FOREIGN PATENT DOCUMENTS

| | | |
|---|---|---|
| EP | 2173086 A2 | 4/2010 |
| EP | 3166300 A1 | 5/2017 |
| JP | 5268542 B2 | 8/2013 |

OTHER PUBLICATIONS

Extended European Search Report issued in corresponding European Application No. 17153999.2 dated Jul. 14, 2017 (14 pages).

* cited by examiner

*Primary Examiner* — Quang N Vo
(74) *Attorney, Agent, or Firm* — Osha Liang LLP

(57) ABSTRACT

An image forming apparatus includes: an image forming section; an image reading sensor and a colorimeter; a temperature sensor; a memory that stores a first color value and a second color value in a first color chart that has a larger number of patches than a second color chart; a processor that creates a scanner profile for converting a first color value into a second color value using color values obtained by the image reading sensor and the colorimeter, corrects the scanner profile according to the color values obtained by the image reading sensor and the colorimeter, and converts the first color value into the second color value using the corrected scanner profile.

8 Claims, 9 Drawing Sheets

FIG.4
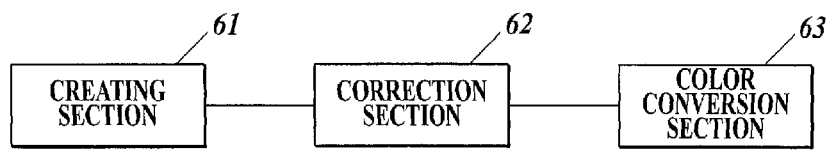
FIG.5
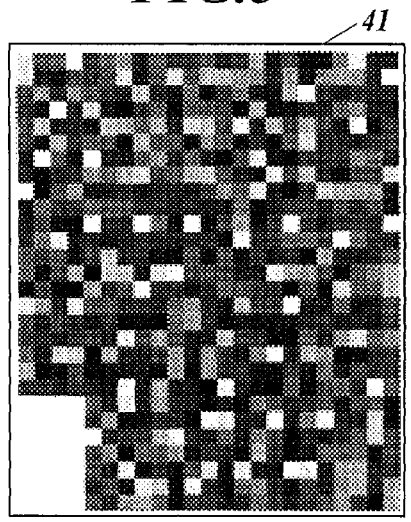
FIG.6
| COLOR No. | INPUT VALUE | | | OUTPUT VALUE | | |
|---|---|---|---|---|---|---|
| | R | G | B | $L^*$ | $a^*$ | $b^*$ |
| 1 | 20 | 21 | 23 | 10 | -1 | -2 |
| 2 | 21 | 21 | 46 | 17 | 2 | -5 |
| 3 | 23 | 24 | 69 | 20 | 8 | -20 |
| ⋮ | ⋮ | ⋮ | ⋮ | ⋮ | ⋮ | ⋮ |

FIG.9

| COLOR No. | CHANGE VALUE PER 1°C | | |
|---|---|---|---|
| | $\Delta L^*$ | $\Delta a^*$ | $\Delta b^*$ |
| 1 | -0.001 | -0.032 | 0.030 |
| 2 | -0.013 | -0.001 | -0.002 |
| 3 | -0.007 | -0.017 | 0.010 |
| 4 | -0.001 | -0.022 | 0.024 |
| 5 | -0.012 | -0.017 | 0.015 |
| 6 | -0.013 | -0.006 | 0.004 |
| 7 | -0.001 | -0.012 | 0.022 |
| 8 | -0.011 | -0.021 | 0.013 |
| 9 | -0.013 | -0.011 | 0.002 |
| 10 | 0.000 | -0.003 | 0.020 |
| 11 | -0.009 | -0.021 | 0.012 |
| 12 | -0.020 | -0.016 | -0.021 |
| 13 | -0.001 | 0.000 | 0.017 |
| 14 | -0.006 | -0.014 | 0.014 |
| 15 | -0.020 | -0.015 | -0.029 |
| 16 | -0.033 | -0.029 | -0.026 |
| 17 | -0.010 | -0.013 | -0.018 |
| 18 | -0.012 | -0.013 | -0.018 |
| ⋮ | ⋮ | ⋮ | ⋮ |

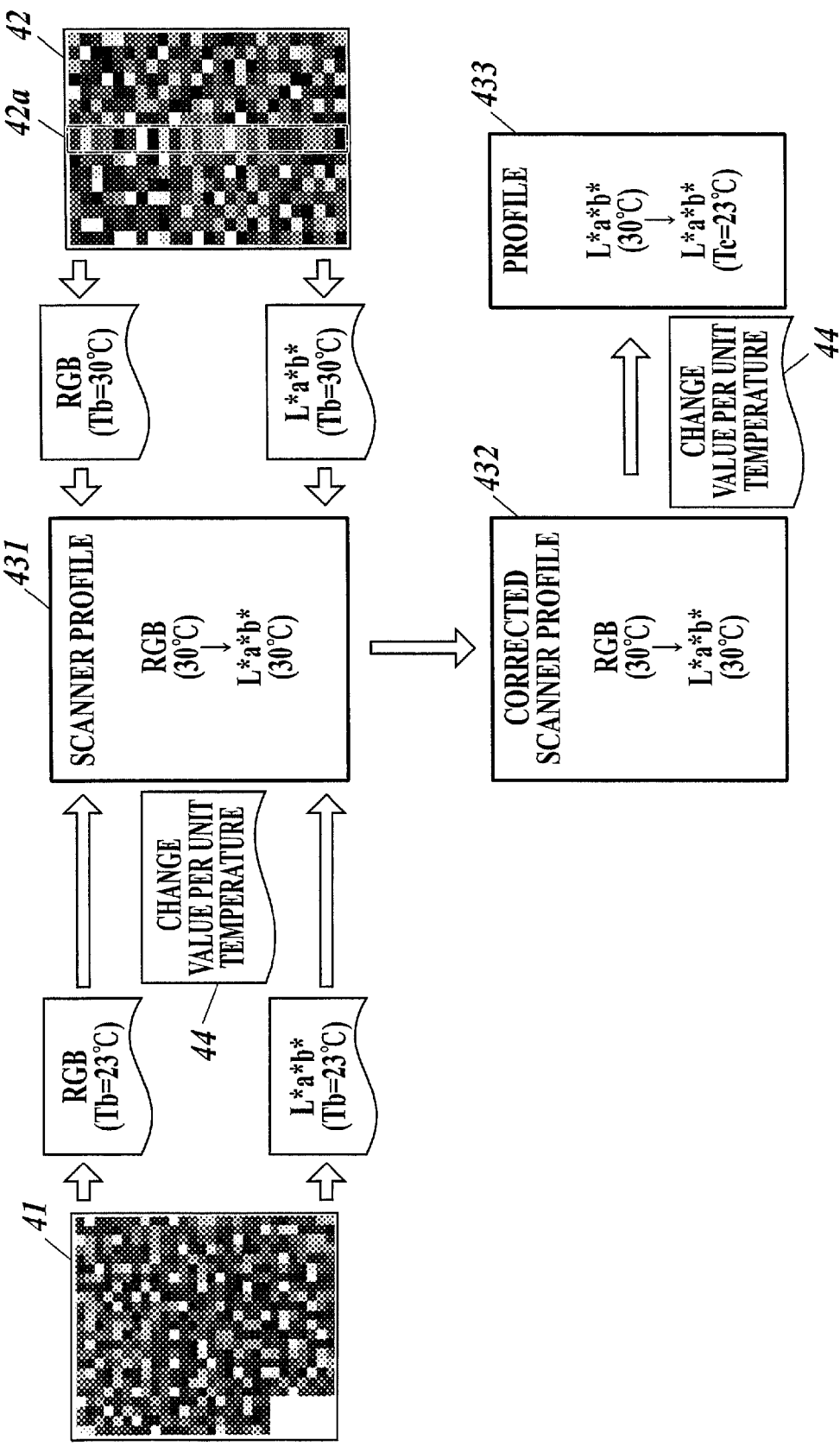

IMAGE FORMING APPARATUS AND COMPUTER READABLE RECORDING MEDIUM

CROSS REFERENCE TO RELATED APPLICATIONS

The entire disclosure of Japanese Patent Application No. 2016-034022 filed on Feb. 25, 2016 including description, claims, drawings, and abstract are incorporated herein by reference.

BACKGROUND OF THE INVENTION

1. Field of the Invention

The present invention relates to an image forming apparatus and a computer readable recording medium.

2. Description of Related Art

Some image forming apparatuses have configurations in which line sensors are disposed on conveyance paths of sheets and sheet surfaces are read by the line sensors to enable test and color adjustment of images formed on the sheets.

Color values such as RGB values obtained by image reading devices such as the line sensors are device-dependent values. Thus, the color values are generally converted into color values of standard color space such as L*a*b* values, which are not device-dependent, by using look up tables (LUTs) which are referred to as scanner profiles.

The scanner profiles can be created by reading, with image reading devices and colorimeters, color charts which were formed on sheets by image forming apparatuses, and associating the color values obtained by the image reading devices as input values with the color values of the standard color space obtained by the color measurement devices as output values.

Colors of images formed on sheets change according to temperatures of the sheet surfaces due to the characteristics of the color materials such as pigments used for the images. Conventional methods measure the change amounts of color values for respective devices in advance and correct, according to the change amounts, the color values which were obtained from the devices into respective color values under intended temperatures (for example, see Japanese Patent No. 5268542).

It is assumed that the temperatures of sheet surfaces also change at the time of creating the scanner profiles due to a series of image formation. Thus, in order to obtain a scanner profile with high accuracy of color conversion, it is necessary to correct color values for each device which change according to temperature.

However, the above correction of color values is effective only for colors for which the change amounts of color values according to temperature were actually measured. In reality, though a color chart having nearly 2000 colors such as FORGA and Japan Color is read for color adjustment in some cases, correction error is large for colors other than the colors having the change amounts measured in advance. Thus, effective correction according to temperature cannot be performed.

The change amounts can be newly measured for the colors which have change values of color values being not measured. However, it is troublesome to measure the change amounts of color values each time a color chart is formed. Furthermore, in order to avoid the increase in size of the apparatus, many image forming apparatuses have color measurement devices therein each of which reads only a part of the sheet surface, not the entire sheet surface. In this case, since the location of patches is limited within a reading range of the color measurement devices, the patches of a color chart need to be arranged on a plurality of sheets to be dispersed, waste sheets are increased, and thus, the cost is increased.

SUMMARY OF THE INVENTION

One or more embodiments of the present invention easily create a scanner profile which is less influenced by the color change according to temperature and has a high accuracy of color conversion.

In one aspect, one or more embodiments provide an image forming apparatus, including: an image forming section which forms a second color chart on a sheet; an image reading sensor and a colorimeter which are disposed on a conveyance path of the sheet, read a sheet surface having the second color chart formed thereon, and respectively output a first color value and a second color value; a temperature measuring section which measures a temperature of a sheet surface that is read by the image reading sensor and the colorimeter; a storage section which stores a first color value and a second color value of each patch in a first color chart that has a larger number of patches than a number of patches in the second color chart; a creating section which creates a scanner profile for converting a first color value obtained by the image reading sensor into a second color value by using the first and second color values of the first color chart; a correction section which corrects the scanner profile according to the first and second color values that are obtained by the image reading sensor and the colorimeter reading each patch in the second color chart; and a color conversion section which converts a first color value obtained by the image reading sensor into a second color value by the corrected scanner profile, wherein the storage section further stores, for each patch in the first color chart, a change amount of each of the first and second color values which change according to the temperature of the sheet surface, when the temperature of the sheet surface at a time of reading the first color chart is a first temperature and the temperature of the sheet surface measured by the temperature measuring section at a time of reading the second color chart is a second temperature, the creating section corrects the first and second color values at the first temperature of the first color chart stored in the storage section to first and second color values at the second temperature according to the change amount, and creates the scanner profile by using the first and second color values at the second temperature after correction, the correction section corrects the scanner profile, which is created by using the first and second color values at the second temperature, according to the first and second color values at the second temperature obtained by reading each patch in the second color chart, and creates a profile for converting, according to the change amount, a second color value at the second temperature of the corrected scanner profile into a second color value which is a value when the temperature of the sheet surface is a third temperature, and the color conversion section converts a first color value at the second temperature obtained by the image reading sensor into a second color value at the second temperature by the corrected scanner profile, and converts the second color value at the second temperature after conversion into a second color value at the third temperature by the profile.

In one or more embodiments of the image forming apparatus, the third temperature is a same temperature as the first temperature.

In one or more embodiments of the image forming apparatus, the creating section and the correction section exclude the first and second color values obtained by reading each patch in the second color chart from a target of correction which is performed according to the change amount.

In one or more embodiments of the image forming apparatus, a reading range of the image reading sensor is an entire sheet surface, and a reading range of the colorimeter is a part of the sheet surface, and the second color chart includes a patch of a basic color which is arranged within a common reading range of the image reading sensor and the colorimeter, the patch of the basic color being used for correcting the scanner profile.

BRIEF DESCRIPTION OF THE DRAWINGS

The above aspects and features of one or more embodiments of the present invention will become more fully understood from the detailed description given hereinafter and the appended drawings which are given by way of illustration only, and thus are not intended as a definition of the limits of one or more embodiments, and wherein:

FIG. 4 is a view showing a main configuration of a profile management section;

FIG. 5 is a view illustrating a first color chart in a case where patches are arranged on a sheet of one page;

FIG. 6 is a table illustrating a scanner profile;

FIG. 9 is a table illustrating change values of color values which change according to temperature;

FIG. 12 is a view showing a process of creating the scanner profile.

DETAILED DESCRIPTION

Hereinafter, an image forming apparatus and a computer readable recording medium according to one or more embodiments will be described with reference to the drawings.

Figure 1:
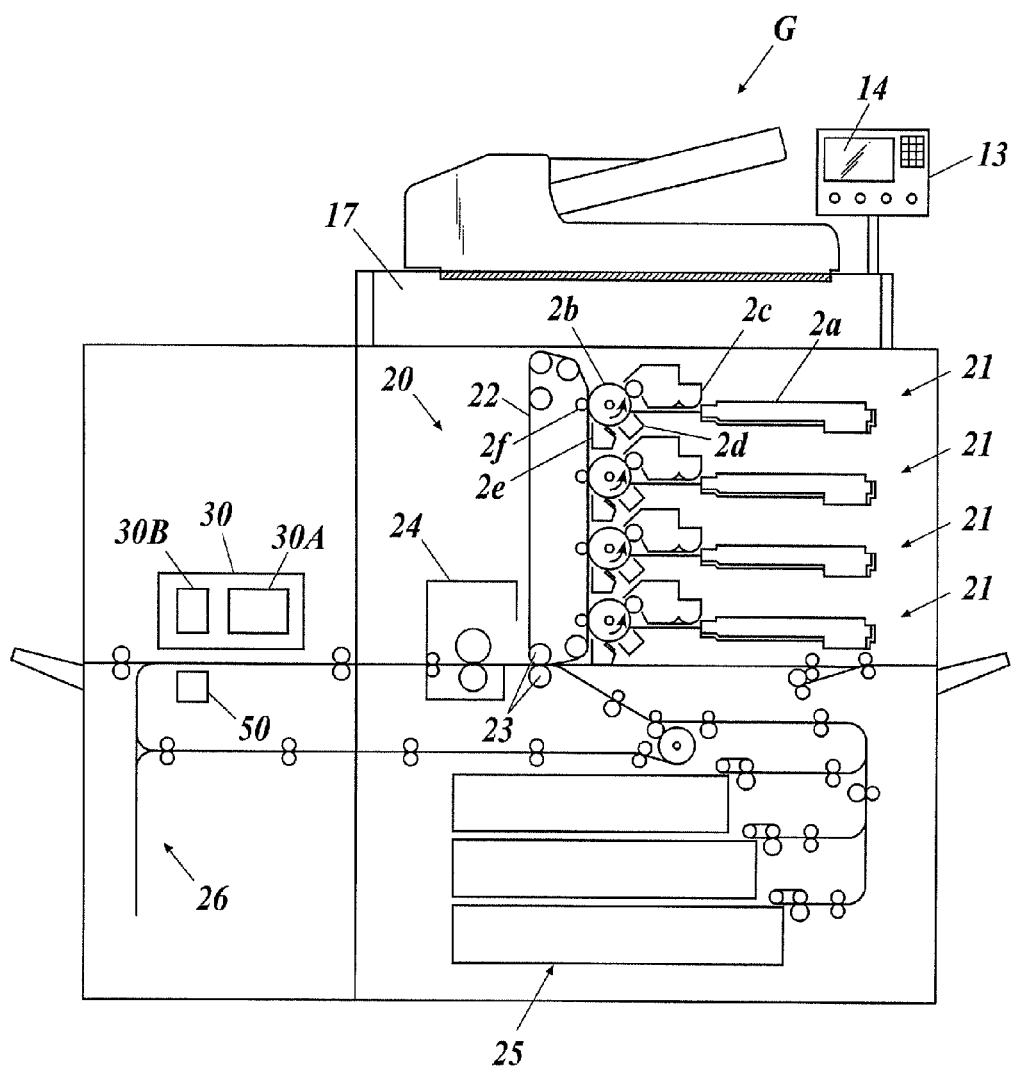
FIG. 1 is a front view showing a schematic configuration of an image forming apparatus according to one or more embodiments.

FIG. 1 shows a schematic configuration of an image forming apparatus G according to one or more embodiments.

As shown in FIG. 1, the image forming apparatus G includes an image forming section 20 which forms an image on a sheet, an image reader section 30 which reads the sheet surface, and a temperature measuring section 50 which measures a temperature of the sheet surface read by the image reader section 30.

Figure 2:
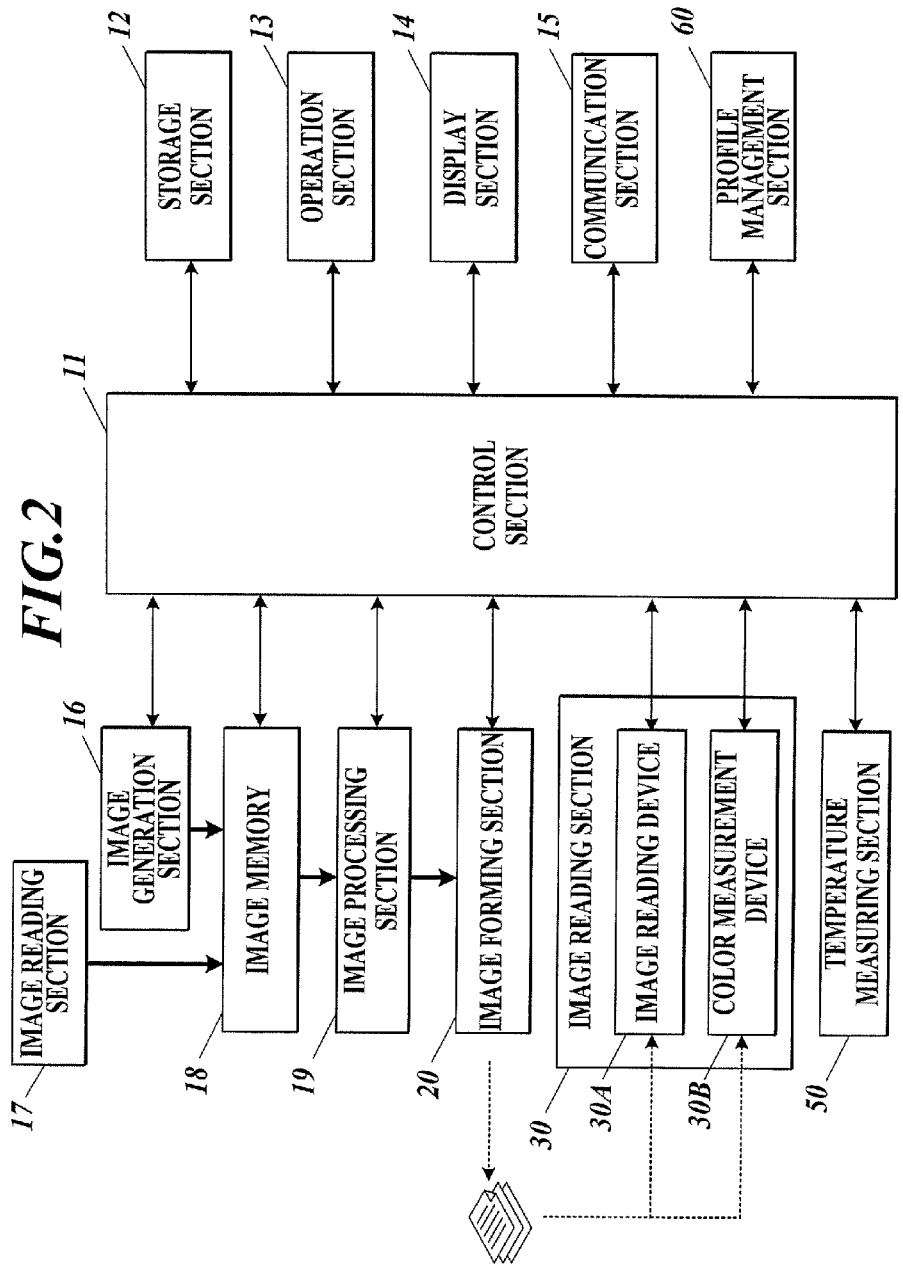
FIG. 2 is a block diagram showing a configuration of the image forming apparatus by its functions.

FIG. 2 shows a main configuration of the image forming apparatus G by its functions.

As shown in FIG. 2, the image forming apparatus G includes a control section 11, a storage section 12, an operation section 13, a display section 14, a communication section 15, an image generation section 16, an image reading section 17, an image memory 18, an image processing section 19, the image forming section 20, the image reader section 30, the temperature measuring section 50 and a profile management section 60.

The control section 11 is configured by including a CPU (Central Processing Unit), a RAM (Random Access Memory) and such like, and controls the sections by reading various programs from the storage section 12 and executing the programs.

For example, the control section 11 controls the image processing section 19 to perform image processing on original image data which was generated by the image generation section 16 or the image reading section 17 and stored in the image memory 18, and controls the image forming section 20 to form an image on a sheet on the basis of the original image data after the image processing.

The control section 11 can also analyze image data obtained by reading the sheet surface after the image formation with the image reader section 30 and perform test, color adjustment and such like of the image.

The storage section 12 stores programs which are readable by the control section 11, files used when executing the programs and such like. A large-capacity memory such as a hard disk can be used as the storage section 12.

For example, the storage section 12 stores a first color value and a second color value of each patch in a first color chart which is used for creating a scanner profile and change amounts according to temperature of the first color value and the second color value.

The operation section 13 generates an operation signal corresponding to user's operation and outputs the operation signal to the control section 11. As the operation section 13, a touch panel and such like which are configured to be integrated with the keypad and display section 14 can be used.

The display section 14 displays an operation screen and such like in accordance with instruction of the control section 11. As the display section 14, an LCD (Liquid Crystal Display), an OELD (Organic ElectroLuminescence Display) and such like can be used.

The communication section 15 communicates with an external device on a network such as a user terminal, a server and other image forming apparatuses, for example.

The communication section 15 receives vector data containing the instruction contents to form an image described in PDL (Page Description Language) via the network from the user terminal.

The image generation section 16 rasterizes the vector data which was received by the communication section 15, and generates original image data in a bitmap format. In the original image data, each pixel has pixel values of four colors which are C (cyan), M (magenta), Y (yellow) and K (black). Each of the pixel values is a data value representing the density of image. For example, the 8 bit data value represents the density of 0 to 255 tones.

The image reading section 17 is configured by including an auto document feeding device, a scanner and such like, and reads a document surface set on a document plate to generate original image data in a bitmap format. In the original image data generated by the image reading section 17, each pixel has pixel values of three colors which are R (red), G (green) and B (blue). The original image data is subjected to color conversion by a color conversion section which is not shown in the drawings and converted into original image data having pixel values of four colors which are C, M, Y and K.

The image memory 18 is a buffer memory which temporarily stores the original image data which was generated by the image generation section 16 or the image reading section 17. As the image memory 18, a DRAM (Dynamic RAM) and such like can be used.

The image processing section 19 reads out the original image data from the image memory 18 and performs various types of image processing such as rotation, enlargement and reduction of image, insertion of page numbers, layout processing such as page aggregation, density correction processing and halftone processing. The halftone processing is processing to reproduce halftones in a pseudo manner by using an error diffusion method, an ordered dither method and such like.

The image forming section 20 forms an image of four colors which are C, M, Y and K on a sheet in accordance with pixel values of the four colors for each pixel of the original image data which was subjected to the image processing by the image processing section 19.

As shown in FIG. 1, the image forming section 20 includes four writing units 21, an intermediate transfer belt 22, secondary transfer rollers 23, a fixing device 24 and sheet feeding trays 25.

The four writing units 21 are disposed in tandem along the belt surface of the intermediate transfer belt 22 and form images of colors which are C, M, Y and K. Each of the writing units 21 has the same structure except for that the color of the image formed by each writing unit 21 is different. As shown in FIG. 1, each of the writing units 21 includes an optical scanning device $2a$, a photoreceptor $2b$, a developing section $2c$, a charging section $2d$, a cleaning section $2e$ and a primary transfer roller $2f$.

At the time of image formation, in each writing unit 21, the photoreceptor $2b$ is charged by the charging section $2d$ and scanned by the bundle of rays which was emitted by the optical scanning device $2a$ on the basis of the original image data, and an electrostatic latent image is formed. After the developing section $2c$ supplies a color material such as a toner and the like to perform developing, an image is formed on the photoreceptor $2b$.

The images which were formed on the respective photoreceptors $2b$ of the four writing units 21 are superimposed on each other in order and transferred (primary transfer) onto the intermediate transfer roller 22 by the respective primary transfer rollers $2f$. In such way, an image formed of individual colors is formed on the intermediate transfer belt 22. After the primary transfer, the cleaning sections $2e$ remove the residual color materials on the photoreceptors $2b$.

In the image forming section 20, a sheet is fed from the sheet feeding tray 25, and the image is transferred (secondary transfer) onto the sheet from the intermediate transfer belt 22 by the secondary transfer rollers 23. Thereafter, the sheet is heated and pressed by the fixing device 24 to be subjected to fixing processing.

In a case where images are to be formed on both sides of a sheet, the sheet is conveyed to the conveyance path 26, reversed and thereafter, conveyed again to the secondary transfer rollers 23.

The image reader section 30 includes an image reading sensor 30A and a colorimeter 30B and uses each of the devices to read the sheet surface on which an image was formed by the image forming section 20.

As shown in FIG. 1, the image reading sensor 30A and the colorimeter 30B are disposed in-line downstream the image forming section 20 on the sheet conveyance path. The image reading sensor 30A and the colorimeter 30B are disposed to be close to each other as shown in FIG. 1 so that the devices read a color chart at as same timing as possible.

The image reading sensor 30A reads the entire surface of the sheet and outputs first color values such as RGB values which are device-dependent.

As the image reading sensor 30A, a line sensor, an area sensor or the like using an imaging element such as a CCD (Charge Coupled Device) can be used.

The colorimeter 30B reads a part of the sheet surface and outputs second color values of a standard color space such as L*a*b* values and XYZ values.

As the colorimeter 30B, there can be used a spectrophotometric colorimeter and such like which analyze the intensities for respective wavelengths of reflected light of the light emitted from a light source to measure colors.

Figure 3:
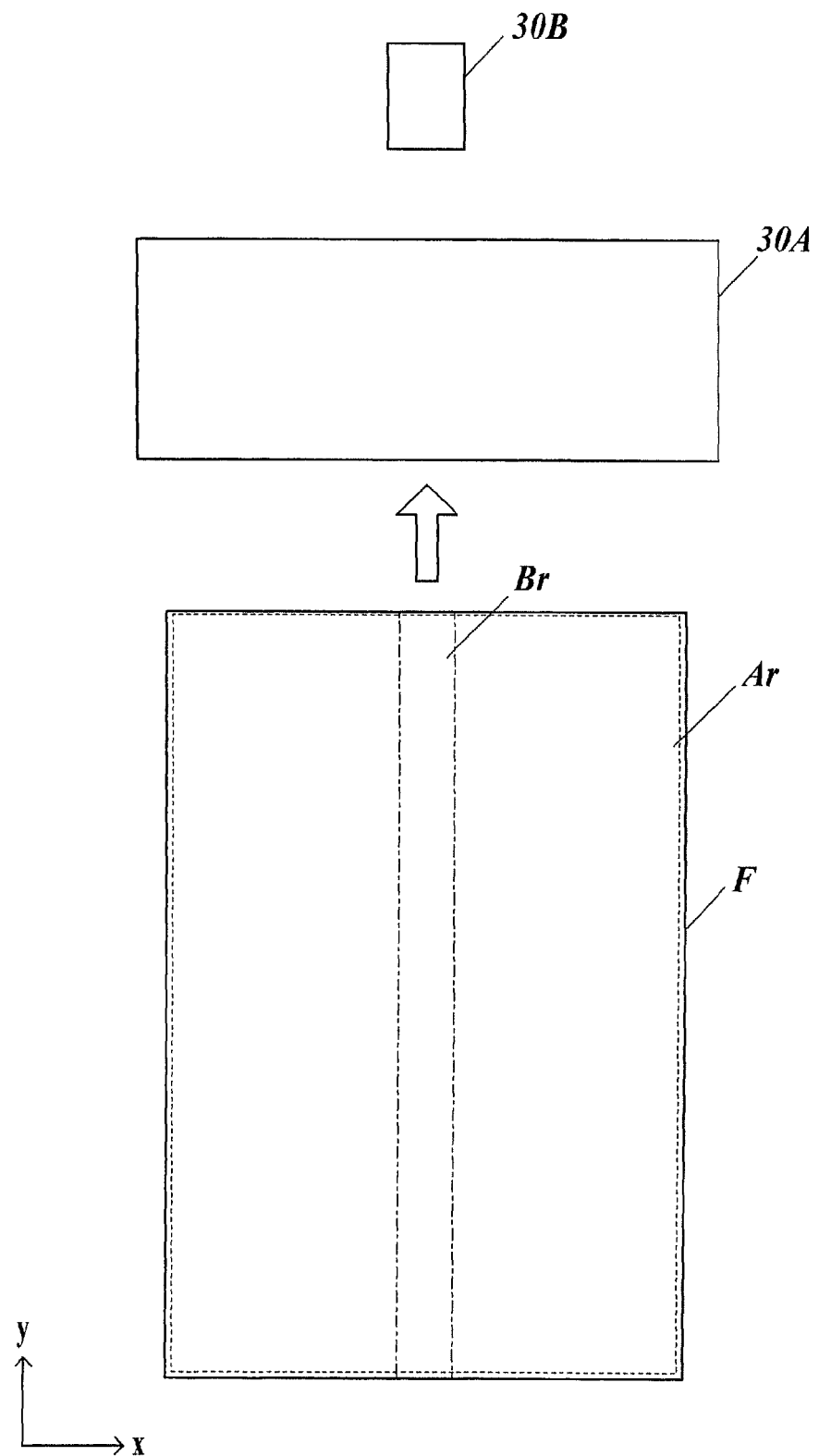
FIG. 3 is an upper view showing an image reading sensor and a colorimeter from the sheet surface.

FIG. 3 shows reading ranges of the image reading sensor 30A and the colorimeter 30B.

As shown in FIG. 3, the image reading sensor 30A and the colorimeter 30B are disposed in series in the conveyance direction y of a sheet F. The devices are disposed so that the central position of the sheet F in the width direction x which is orthogonal to the conveyance direction y is consistent with the central position in the width direction x of each of the devices.

The reading range Ar of the image reading sensor 30A is the entire sheet surface as shown in FIG. 3. For example, in a case where the image reading sensor 30A is a line sensor, the imaging elements are disposed over the entire width of the width direction x of the sheet F, and the entire surface of sheet F can be read by continuously reading the sheet F which is being conveyed in the conveyance direction y.

On the other hand, since the colorimeter 30B reads the spot area of the light emitted from the light source for color measurement, the reading range Br of the colorimeter 30B is not the entire sheet surface, but only the central portion of the width direction x where the colorimeter 30B is located.

As shown in FIG. 1, the temperature measuring section 50 is disposed near the image reading sensor 30A and the colorimeter 30B, and measures the temperature of sheet surface read by the devices.

As the temperature measuring section 50, a temperature sensor such as a thermopile can be used.

The profile management section 60 creates and optimizes a scanner profile, and converts the first color values obtained by the image reading sensor 30A into the second color values of standard color space which are not device-dependent by using the optimized scanner profile.

Such profile management section 60 can be achieved by reading a program with the CPU and performing software processing of executing processing procedures for creation of the scanner profile and color conversion.

The scanner profile is a color profile for the image reading sensor 30A.

As represented by an ICC (International Color Consortium) profile, the color profile is a look up table (LUT) determining output values after color conversion of respective input values. From input values as grid points in the LUT, the respective output values between the grid points can be obtained by interpolation calculation.

FIG. 4 represents the main configuration of the profile management section 60 by its functions.

As shown in FIG. 4, the profile management section 60 includes a creating section 61, a correction section 62 and a color conversion section 63.

Hereinafter, a processing procedure of creating a scanner profile in the profile management section 60 will be described.

[Creation of Scanner Profile]

First, the creating section 61 creates a scanner profile for converting a first color value obtained by the image reading sensor 30A into a second color value by using first and second color values of each patch in a first color chart stored in the storage section 12.

The first and second color values of each patch in the first color chart stored in the storage section 12 can be obtained as follows.

The image forming section 20 loaded in the image forming apparatus G forms the first color chart on a sheet. A sheet having a high glossiness such as coated paper is used as the sheet from the viewpoint of obtaining a scanner profile of broad color gamut.

The first color chart is a chart having multiple patches which have different colors, and patches of 600 colors can be used, for example. Colors of patches are selected to nearly comprehend the color gamut, which can be reproduced by the image forming section 20 so that the scanner profile can have high color conversion accuracy.

In order to remove the influence of temperature on the image color, the sheet having the first color chart formed thereon is left under a fixed temperature for a sufficient time, and thereafter, the sheet surface is read under the same fixed temperature by the image reading sensor 30A and the colorimeter 30B loaded in the image forming apparatus G to obtain the first and second color values of each patch in the first color chart. When the temperature of sheet surface at the time of reading the first color chart is represented by a first temperature Ta, the first and second color values obtained by reading the first color chart are respectively first and second color values at the first temperature Ta. The first temperature Ta is, for example, 23° C. which is a room temperature environment.

In a case where the reading is performed by the image reading sensor 30A and the colorimeter 30B loaded in the image forming apparatus G, there can be used the first color chart which has patches arranged within the common reading range of the image reading sensor 30A and the colorimeter 30B on sheet surfaces of a plurality of pages. The first color chart may be read by another device which is a same device type as the image reading sensor 30A and the colorimeter 30B loaded in the image forming apparatus G. In this case, as shown in FIG. 5, there can be used a first color chart 41 which has patches arranged over the entire sheet surface of one page. When forming a color chart, the color chart is formed only on one side of sheet in order to enhance the reading accuracy.

The creating section 61 creates, as a scanner profile, a three-dimensional or four-dimensional LUT or the like having the first color values of respective patches as input values and the second color values of the patches as output values for the first color chart, and stores the created scanner profile in the storage section 12. The scanner profile is a profile for converting a first color value at the first temperature Ta into a second color value at the first temperature Ta.

FIG. 6 is a table illustrating the scanner profile.

As shown in FIG. 6, the first color values (RGB values) and the second color values (L*a*b* values) obtained by reading the patches are associated, respectively as input values and output values, with respective color numbers identifying the colors of patches in the first color chart.

[Correction of Scanner Profile]

Next, the correction section 62 corrects the scanner profile created by the creating section 61 according to first and second color values obtained by reading respective patches in a second color chart with the image reading sensor 30A and the colorimeter 30B.

Since the first and second color values of the patches in the first color chart are color values obtained from a specific sheet, the color values may have different color reproducibility from a sheet which is frequently used in the image forming apparatus G. In addition, the scanner profile created by the creating section 61 is not necessarily an optimum scanner profile for the current image forming apparatus G when there are an individual difference, temporal change of reading property and such like of the image reading sensor 30A and the colorimeter 30B which were used for reading the first color chart. Therefore, the scanner profile to be used is optimized by correcting the created scanner profile.

Specifically, in the image forming apparatus G, a second color chart is formed on a sheet by the image forming section 20. A sheet which is frequently used in the image forming apparatus G is used as the sheet since it is possible to create a scanner profile corresponding to the type of sheet to be used.

The second color chart is a color chart having a smaller number of colors than that of the first color chart. By using a color chart having a small number of colors, the scanner profile can be easily optimized. It is also possible to reduce consumption of sheets and reduce the cost for the image forming apparatus G having the colorimeter 30B which has a small reading range.

Figure 7:
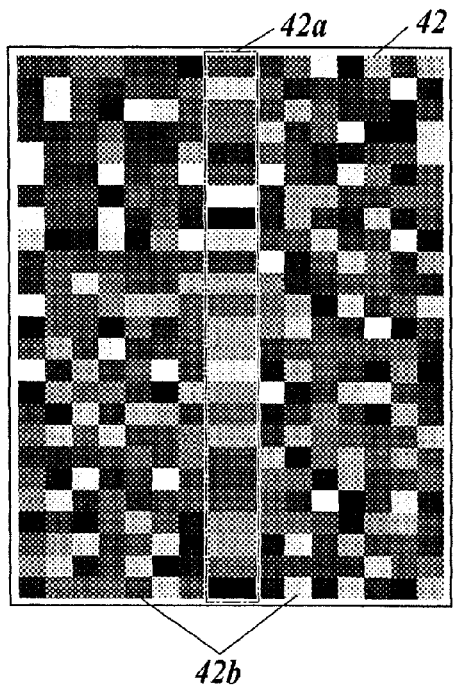
FIG. 7 is a view illustrating a second color chart.

FIG. 7 shows an example of the second color chart.

As shown in FIG. 7, the second color chart 42 has basic color patches 42a and patches 42b of respective colors which are arranged on a sheet of one page, the basic color patches 42a corresponding to respective grid points of grey axis of center and outer frame of the color gamut of the scanner profile created by the creating section 61, and the patches 42b corresponding to respective grid points inside the color gamut. The basic color patches 42a used for correcting the scanner profile are arranged to be located within the common reading range (reading range Br shown in FIG. 3) of the image reading sensor 30A and the colorimeter 30B, and the patches 42b are arranged within the range (reading range Ar excluding the reading range Br shown in FIG. 3) which is read by the image reading sensor 30A only. The patches 42b need not have colors common to those of patches in the first color chart and may have different colors.

The sheet surface having the second color chart formed thereon is read by the image reading sensor 30A and the colorimeter 30B. The correction section 62 corrects the scanner profile according to first color values of the respective patches of basic colors which were obtained by the image reading sensor 30A and second color values which were obtained from the same basic color patches by the colorimeter 30B. As described above, since the basic colors correspond to the grid points of the gray axis and the outer frame of the color gamut of the scanner profile, at the time of correction, the positions of these grid points are moved to positions of grid points corresponding to the obtained first and second color values, and interpolation movement is performed to the positions of inside grid points according to the movement amounts of the respective grid points.

The scanner profile obtained by the correction is a multi-dimensional LUT having the first color values as input values and the second color values as output values similarly to the scanner profile created by the creating section 61. The scanner profile obtained by the correction is a scanner profile optimized according to the type of sheet which is generally used in the image forming apparatus G, and the individual difference, current reading property and such like of the image reading sensor 30A.

The color conversion section 63 converts a first color value obtained by the image reading sensor 30A into a second color value by using the scanner profile which was corrected by the correction section 62. Since the corrected scanner profile is based on the scanner profile having a broad color gamut which was created from the first color chart having a large number of colors, the corrected scanner profile enables color conversion with high accuracy equivalent to the scanner profile created by the creating section 61. The color conversion can be performed with high accuracy also for colors other than the colors of the first color chart which was used at the time of creating the scanner profile, such as the colors of patches 42b in the second color chart 42 shown in FIG. 7.

A printer profile can be created by converting, with the color conversion section 63, the first color values obtained by reading all the patches in the second color chart with the image reading sensor 30A into second color values by using the corrected scanner profile, and associating the converted second color values with third color values such as CMYK values of respective patches. The printer profile is a color profile for the image forming section 20.

[Case where Temperature Changes]

The color of an image formed on the sheet changes according to temperature due to the characteristics of color materials. If the sheet surface is constantly under a fixed temperature that is the first temperature Ta, there is no change in color values according to temperature, and thus, the color conversion may be performed by using the above-mentioned scanner profile for converting a first color value at the first temperature Ta into a second color value at the first temperature Ta.

However, the temperature environment of the image forming apparatus G is not fixed, and the temperature of sheet surface at the time of reading the second color chart is not necessarily the first temperature Ta. For example, immediately after the activation of image forming apparatus G, the temperature of sheet surface is close to the environmental temperature at this time. However, since the internal temperature of the image forming apparatus G rises after sufficiently performing image formation, the temperature of sheet surface easily becomes a high temperature with respect to the environmental temperature. The patch colors on the sheet surface with a high temperature change when they are cooled under room temperature which is a temperature when observing the image. Thus, in a case where the temperature of sheet surface at the time of reading the second color chart is the second temperature Tb which is different from the first temperature Ta at the time of reading the first color chart, it is necessary to correct the color values according to the temperature.

[Change Amounts of Color Values Changing According to Temperature]

In order to correct the color values according to the temperature, the storage section 12 stores change values according to temperature of the first and second color values of the patches in the first color chart. The change amounts of color values according to temperature stored in the storage section 12 can be determined as follows.

Figure 8:
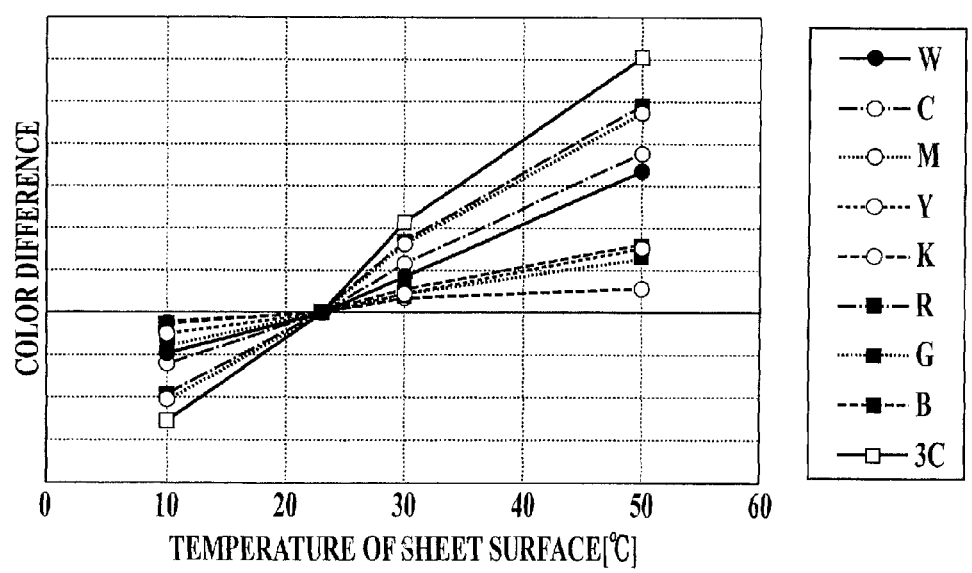
FIG. 8 is a graph showing color differences of nine colors with respect to the temperature of sheet surface.

FIG. 8 shows temperature characteristics of nine colors that are W, C, M, Y, K, R, G, B and 3C. The W indicates the color of white paper, and the 3C indicates the mixed color (process black) pf the C, M and Y.

In FIG. 8, the horizontal axis and longitudinal axis respectively represent the temperature of sheet surface (° C.) and the color difference compared with a color when the temperature of sheet surface is 23° C.

As shown in FIG. 8, for every color, the color difference is increased nearly linearly as the temperature rises. Especially, the color differences are largely increased for warm colors among the above colors.

Since colors change nearly linearly according to temperature in such way, the change amount per unit temperature is determined for the first and second color values of the patches in the first color chart which change according to temperature.

Specifically, a first color chart is formed on a sheet by the image forming section 20. At this time, similarly to the basic color patches 42a of the second color chart 42 shown in FIG. 7, the first color chart having the patches that are arranged in the common reading range (reading range Br shown in FIG. 3) are formed to be distributed over a plurality of pages. Thus, the sheet surface can be read by the image reading sensor 30A and the colorimeter 30B at as same timing as possible.

Then, the sheet surface under a high temperature immediately after passing the fixing device 24 is read by the image reading sensor 30A and the colorimeter 30B, and the temperature TH (° C.) of the sheet surface is measured by the temperature measuring section 50.

After cooling the sheet, the sheet surface is read again by the image reading sensor 30A and the colorimeter 30B, and the temperature TL (° C.) of the sheet surface is measured by the temperature measuring section 50.

As described above, since the first color value of each patch changes nearly linearly with respect to the temperature change of sheet surface, the change amount of first color value per unit temperature can be determined by the difference in first color value between the temperatures TH and TL and the temperature difference between the temperatures TH and TL. The same applies to the second color value of each patch, and the change amount of second color value per unit temperature can be determined by the difference in second color value between the temperatures TH and TL and the temperature difference between the temperatures TH and TL.

For example, in a case where the difference in L* value of a patch between temperatures TH and TL is +0.007, and the temperature difference (TH−TL) is 7° C., the change amount of L* value per +1° C. of the patch is determined to be +0.001. In order to reduce the error at the time of correction, the change amount may be an average value of change amounts determined by performing the reading a plurality of times.

FIG. 9 is a table illustrating the change amounts per unit temperature of the second color values.

As shown in FIG. 9, in the table, the change amounts of L* value, a* value and b* value per +1° C. are associated with the each color number identifying the color of patch in the first color chart. The patch color corresponding to the change amounts in the first color chart can be specified by the color number.

The change amounts of the first and second color values per unit temperature are nearly the same, regardless of the type of sheet.

Figure 10A:
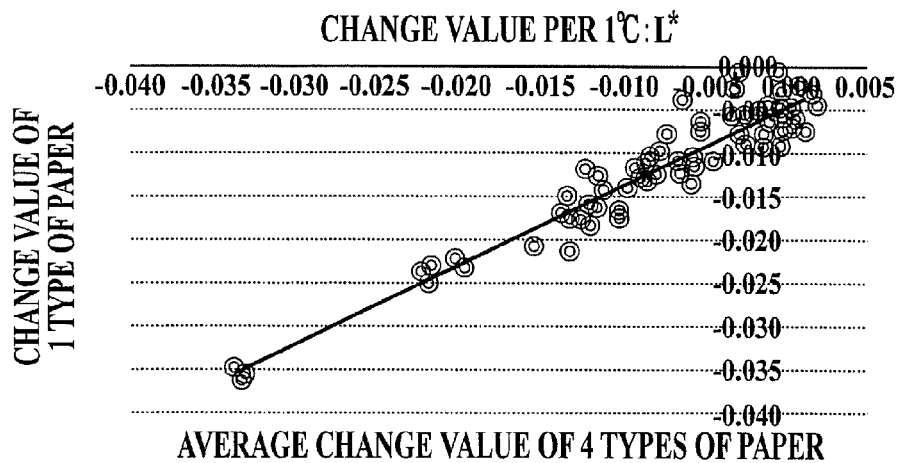
FIG. 10A is a graph showing a relationship between an average value of change values of L* value per unit temperature determined by using four types of sheets and a change value of L* value per unit temperature determined by using one type of sheet among the four types of sheets.
Figure 10B:
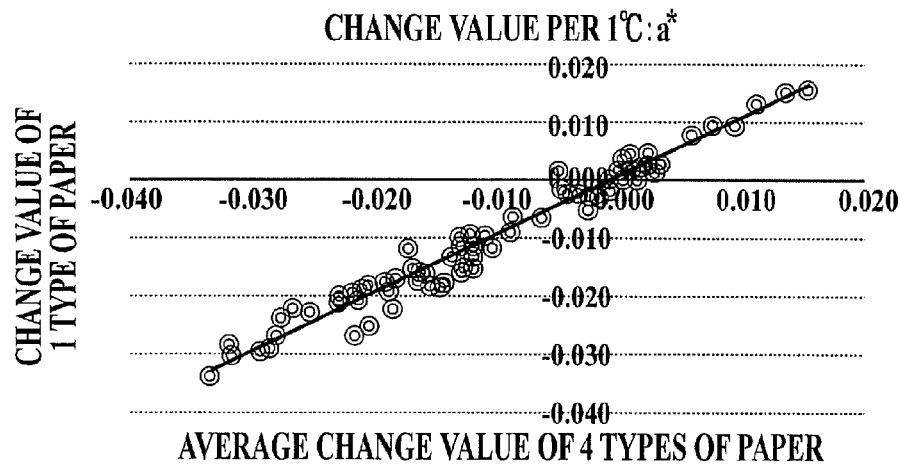
FIG. 10B is a graph showing a relationship between an average value of change values of a* value per unit temperature determined by using four types of sheets and a change value of a* value per unit temperature determined by using one type of sheet among the four types of sheets.
Figure 10C:
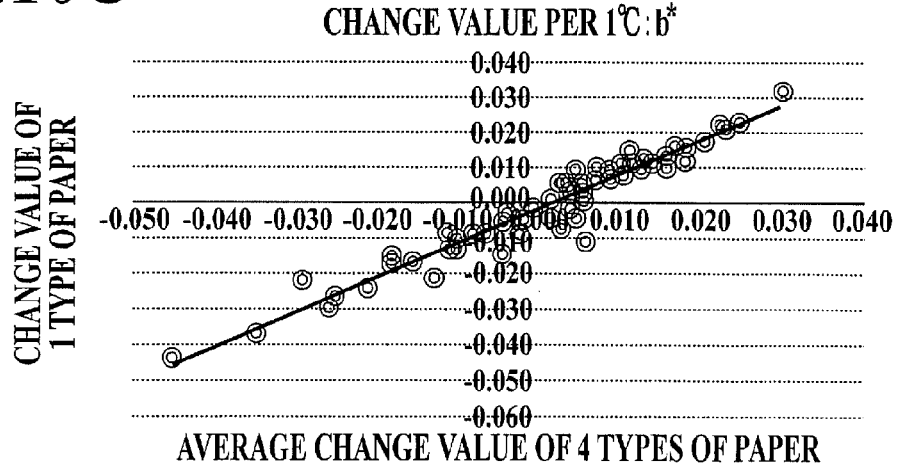
FIG. 10C is a graph showing a relationship between an average value of change values of b* value per unit temperature determined by using four types of sheets and a change value of b* value per unit temperature determined by using one type of sheet among the four types of sheets.

FIGS. 10A to 10C show the relationship between the average value of change amounts per 1° C. determined by using four types of paper and the change amount determined by using one type of paper among the four types of paper, respectively for L* value, a* value and b* value.

As shown in FIGS. 10A to 10C, the average value of four types of paper and the change amount of one type of paper among the four types of paper have nearly 1:1 relationship, and nearly the same change amounts are obtained regardless of the type of paper.

Figure 11:
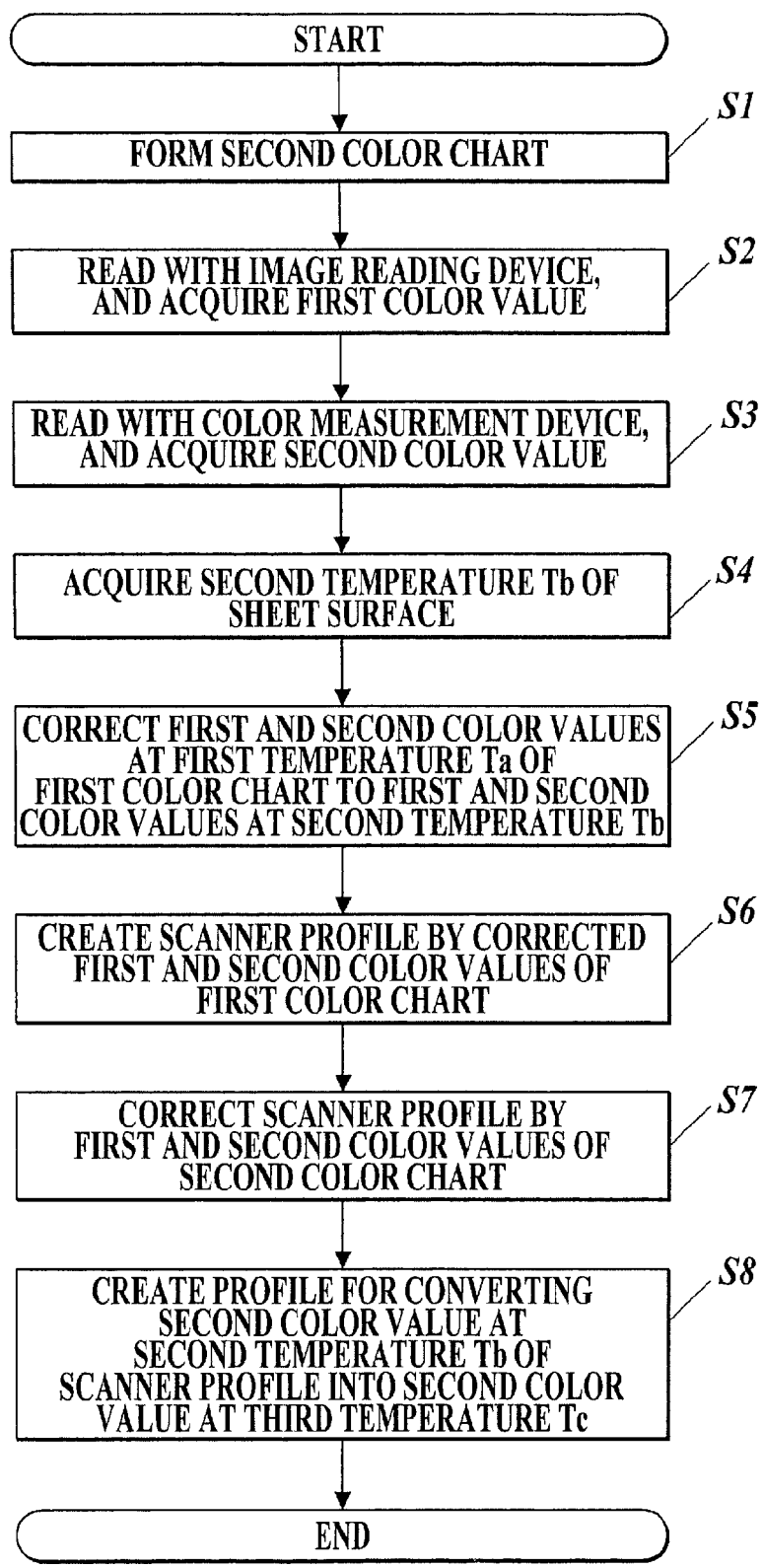
FIG. 11 is a flowchart showing a processing procedure when correcting color values which change according to temperature and creating a scanner profile.

FIG. 11 shows a processing procedure when correcting color values which change according to temperature and creating the scanner profile.

As shown in FIG. 11, in the image forming apparatus G, a second color chart is formed on a sheet by the image forming section 20 (step S1).

The image reading sensor 30A reads the sheet surface and obtains first color values of all the patches in the second color chart (step S2). The colorimeter 30B also reads the sheet surface and obtains second color values of a part of the patches in the second color chart, that is, the basic color patches (step S3). The temperature measuring section 50 measures the temperature of sheet surface read by the image reading sensor 30A and the colorimeter 30B as a second temperature Tb (step S4).

In the profile management section 60, the creating section 61 obtains, from the storage section 12, first and second color values at a first temperature of respective patches in a first color chart and the change amounts of the first and second color values which change according to temperature. The creating section 61 corrects the obtained first and second color values at the first temperature Ta of the first color chart to the first and second color values at the second temperature Tb by the obtained respective change amounts (step S5). The creating section 61 creates a scanner profile for converting a first color value at the second temperature Tb into a second color value at the second temperature Tb by using the first and second color values at the second temperature Tb after correction (step S6).

Next, the correction section 62 corrects the scanner profile created by the creating section 61 according to the first and second color values respectively obtained by reading the basic color patches in the second color chart with the image reading sensor 30A and the colorimeter 30B (step S7). The correction is performed by moving the grid points as described above. By the correction, a scanner profile for converting a first color value at the second temperature Tb into a second color value at the second temperature Tb is obtained.

Furthermore, by using the change amounts obtained from the storage section 12, the correction section 62 corrects second color values at the second temperature Tb in the corrected scanner profile to second color values at a third temperature Tc when observing the image. Then, the correction section 62 creates a profile of a three-dimensional LUT for converting a second color value at the second temperature Tb before correction into a second color value at the third temperature Tc after the correction (step S8). When creating the profile, since the grid points are not integers, the three-dimensional LUT may be created by interpolating the grid points or matrix calculation.

The third temperature Tc can be the same temperature as the first temperature Ta. The third temperature Tc may be a temperature which was set in advance as a reference temperature or a temperature which was set by a user. The reference temperature can be 23° C. of room temperature which is a general temperature for observing an image, for example.

The color conversion section 63 converts the first color values at the second temperature Tb obtained by the image reading sensor 30A perform the reading into the second color values at the second temperature Tb by using the corrected scanner profile. Further, the color conversion section 63 converts the second color values at the second temperature Tb after conversion into the second color values at the third temperature Tc by using the profile which was created together with the corrected scanner profile. The color conversion by the profile is color conversion from the second color values to the second color values in the same color space, and the directions of changing the grid points in the color gamut by the color conversion are consistent. Thus, the color conversion by this profile has a high accuracy compared to the profile of directly converting the first color values into the second color values in a different color space.

FIG. 12 illustrates a process until obtaining the scanner profile for converting RGB values into L*a*b* values by the above-mentioned processing procedure.

As shown in FIG. 12, in a case where the first temperature Ta when reading the first color chart 41 is 23° C., RGB values at 23° C. and L*a*b* values at 23° C. are obtained from the first color chart 41. In a case where the second temperature Tb when reading the second color chart 42 is 30° C., correction corresponding to the temperature difference 7° C. from the first temperature Ta is performed to the RGB values and the L*a*b* values in the first color chart 41 by using the change values 44 per unit temperature, and thereby, a scanner profile 431 for converting the RGB values at 30° C. into the L*a*b* values at 30° C. is obtained.

Next, by correcting the scanner profile 431 according to RGB values and L*a*b* values at 30° C. of the basic color patches 42a in the second color chart 42, a scanner profile 432 for converting first color values at 30° C. obtained by the image reading sensor 30A into second color values at 30° C. is obtained. In a case where the third temperature Tc is 23° C. which is the same as the first temperature Ta, according to the temperature difference 7° C. between the second temperature Tb and the third temperature Tc, by correcting the L*a*b* values at 30° C. of the scanner profile 432 with the change values 44 per unit temperature, a profile 433 for converting the L*a*b* values at 30° C. into the L*a*b* values at 23° C. is obtained.

As described above, the image forming apparatus G of one or more embodiments includes: an image forming section 20 which forms a second color chart on a sheet; an image reading sensor 30A and a colorimeter 30B which are disposed on a conveyance path of the sheet, read the sheet surface having the second color chart formed thereon, and output first color values and second color values respectively; a temperature measuring section 50 which measures a temperature of the sheet surface read by the image reading sensor 30A and the colorimeter 30B; a storage section 12 which stores first and second color values of respective patches in a first color chart having a larger number of patches than that of the second color chart; a creating section 61 which creates a scanner profile for converting a first color value obtained by the image reading sensor 30A into a second color value by using the first and second color values of the first color chart; a correction section 62 which corrects the scanner profile according to the first and second color values obtained by reading the patches in the second color chart with the image reading sensor 30A and the colorimeter 30B; and a color conversion section 63 which converts a first color value obtained by the image reading sensor 30A into a second color value with the corrected scanner profile.

The storage section 12 further stores a change amount of each of the first and second color values which change according to the temperature of the sheet surface for each of the patches in the first color chart. When the temperature of sheet surface at the time of reading the first color chart is a first temperature Ta and the temperature of sheet surface measured by the temperature measuring section 50 at the time of reading the second color chart is a second temperature Tb, the creating section 61 corrects the first and second color values at the first temperature Ta of the first color chart stored in the storage section 12 to first and second color values at the second temperature Tb according to the change amounts, and creates the scanner profile by using the first and second color values at the second temperature Tb after the correction. The correction section 62 corrects the scanner profile which was created by using the first and second color values at the second temperature Tb according to the first and second color values at the second temperature Tb which were obtained by reading the patches in the second color chart, and creates a profile for converting a second color value at the second temperature Tb of the corrected scanner profile into a second color value when the temperature of sheet surface is a third temperature Tc according to the change amount. The color conversion section 63 converts a first color value at the second temperature Tb obtained by the image reading sensor 30A into a second color value at the second temperature Tb with the scanner profile corrected by the correction section 62, and converts the second color value at the second temperature Tb after the conversion into a second color value at the third temperature Tc with the profile created by the correction section 62.

The scanner profile is created by using the first and second color values of the first color chart having many colors, and thereafter, the scanner profile is corrected to be optimized by using the first and second color values obtained by reading the second color chart. Thus, it is possible to easily create a scanner profile with high color conversion accuracy. Even when the temperature changes, by performing the correction according to the change amounts of first and second color values, it is possible to create a scanner profile which is less influenced by the color change according to the temperature.

In one or more embodiments, the creating section 61 excludes the first and second color values obtained by reading the second color chart from the target of correction using the change amounts of color values according to temperature.

The correction using change amounts of color values which change according to temperature is effective only for colors which have the change amounts actually measured. The first color chart used for creating the scanner profile has many colors and the colors are widely distributed in the color gamut compared to the second color chart used for correcting the scanner profile. Thus, in a case where the temperature changes, the correction error can be largely reduced by setting, as a correction target, the first and second color values of respective patches in the first color chart, not the first and second color values obtained by reading the respective patches in the second color chart.

The change of color value according to temperature is large especially for warm colors among the colors. Since the second color chart has a smaller number of colors than that of the first color chart, the number of warm colors is further limited. Thus, by excluding the first and second color values obtained by the second color chart from the target of correction using the change amounts, it is possible to avoid the increase in correction error due to insufficient cover of the correctable color gamut.

Since it is not necessary to store the change amounts according to temperature of the first and second color values of the second color chart, the freedom of selecting the second color chart is improved.

The present invention is not limited to the above embodiments. Modifications can be appropriately made within the scope of the present invention.

For example, one or more embodiments of the present invention are not only applied to the image forming apparatus G, and the above processing procedure for creating the scanner profile can be executed by causing a computer such as a general-purpose PC to read programs.

As a computer readable medium of programs, a non-volatile memory such as a ROM and a flash memory, and a portable recording medium such as a CD-ROM can also be applied. A carrier wave may also be applied as medium providing program data via a communication line.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image forming apparatus, comprising:
a memory that stores a first color value and a second color value of each patch in a first color chart;
an image forming section comprising a transfer belt and that forms a second color chart on a sheet, wherein the first color chart has more patches than the second color chart;
an image reading sensor a colorimeter that is disposed on a conveyance path of the sheet, reads a sheet surface of the sheet with the second color chart, and outputs a first color value;
a colorimeter that is disposed on the conveyance path of the sheet, reads the sheet surface of the sheet with the second color chart, and outputs a second color value;
a temperature sensor that measures a temperature of the sheet surface read by the image reading sensor and the colorimeter;
a processor that:
  creates, based on the first and second color values of the first color chart stored in the memory, a scanner profile for converting the first color value obtained by the image reading sensor into another second color value;
  corrects the scanner profile based on the first and second color values that are obtained by the image reading sensor and the colorimeter, respectively; and
  converts the first color value obtained by the image reading sensor into the another second color value based on the corrected scanner profile,
wherein the memory further stores a change amount of each of the first and second color values of each patch in the first color chart that changes according to the temperature of the sheet surface, wherein when the temperature of the sheet surface at a time of reading the first color chart stored in the memory is a first temperature and the temperature of the sheet surface measured by the temperature measuring section at a time of reading the second color chart is a second temperature, the processor corrects the first and second color values of the first color chart stored in the memory using the change amount, and creates the scanner profile using the corrected first and second color values, wherein the processor corrects the scanner profile, created with the corrected first and second color values, using the first and second color values obtained at the second temperature by the image reading sensor and the colorimeter, respectively, and creates a profile for converting the second color value of the corrected scanner profile into another second color value when the temperature of the sheet surface is at a third temperature using the change amount, and wherein the processor converts the first color value at the second temperature obtained by the image reading sensor into another second color value at the second temperature, and further converts the converted second color value into a second color value when the temperature of the sheet surface is at the third temperature using the profile.

2. The image forming apparatus according to claim 1, wherein the third temperature is equal to the first temperature.

3. The image forming apparatus according to claim 1, wherein the processor excludes the first and second color values obtained by reading each patch in the second color chart from a target of correction.

4. The image forming apparatus according to claim 1, wherein a reading range of the image reading sensor is an entire sheet surface, and a reading range of the colorimeter is apart of the sheet surface, and the second color chart includes a patch of a basic color used for correcting the scanner profile that is arranged within a common reading range of the image reading sensor and the colorimeter.

5. A non-transitory computer readable recording medium which stores a program for causing a computer to execute a procedure, the procedure comprising:

obtaining, from a memory, a first color value and a second color value of each patch in a first color chart;

forming a second color chart on a sheet using an image forming section with a transfer belt, wherein the first color chart has more patches than the second color chart;

reading a sheet surface of the sheet with the second color chart using an image reading sensor and a colorimeter that are disposed on a conveyance path of the sheet, and outputs a first color value and a second value, respectively;

measuring, using a temperature sensor, a temperature of the sheet surface that is read by the image reading sensor and the colorimeter;

creating, based on the first and second color values of the first color chart stored in the memory, a scanner profile for converting the first color value obtained by the image reading sensor into another second color value;

correcting the scanner profile based on the first and second color values that are obtained by the image reading sensor and the colorimeter, respectively; and converting the first color value obtained by the image reading sensor into the another second color value based on corrected scanner profile, wherein the memory further stores a change amount of each of the first and second color values of each patch in the first color chart that change according to the temperature of the sheet surface, wherein when the temperature of the sheet surface at a time of reading the first color chart stored in the memory is a first temperature and the temperature of the sheet surface measured by the temperature measuring section at a time of reading the second color chart is a second temperature, the processor corrects the first and second color values of the first color chart stored in the memory using the change amount, and creates the scanner profile using the corrected first and second color values, wherein the processor corrects the scanner profile, created with the corrected first and second color values, using the first and second color values obtained at the second temperature by the image reading sensor and the colorimeter, respectively, and creates a profile for converting the second color value of the corrected scanner profile into another second color value when the temperature of the sheet surface is at a third temperature using the change amount, and wherein the processor converts the first color value at the second temperature obtained by the image reading sensor into another second color value at the second temperature, and further converts the converted second color value into a second color value when the temperature of the sheet surface is at the third temperature using the profile.

6. The recording medium according to claim 5, wherein the third temperature is equal to the first temperature.

7. The recording medium according to claim 5, wherein the processor excludes the first and second color values obtained by reading each patch in the second color chart from a target of correction.

8. The recording medium according to claim 5, wherein a reading range of the image reading sensor is an entire sheet surface, and a reading range of the colorimeter is a part of the sheet surface, and the second color chart includes a patch of a basic color used for correcting the scanner profile that is arranged within a common reading range of the image reading sensor and the colorimeter.

* * * * *